April 20, 1954 R. V. LACKNER ET AL 2,676,234

INDUCTION FURNACE

Filed Jan. 12, 1951 8 Sheets-Sheet 1

Robert V. Lackner
John A. Logan
Vincent J. Logan
INVENTORS.

BY Slough & Slough
ATTORNEYS.

INDUCTION FURNACE

Filed Jan. 12, 1951 8 Sheets-Sheet 2

Robert V. Lackner
John A. Logan
Vincent J. Winkle.
INVENTORS.

BY Slough & Slough
ATTORNEYS.

Robert V. Lackner
John A. Logan
Vincent J. Winkle,
INVENTORS.
BY Slough & Slough, ATTORNEYS.

Robert V. Lackner
John A. Logan
Vincent J. Winkle,
INVENTORS.
BY Slough & Slough. ATTORNEYS.

INDUCTION FURNACE

Filed Jan. 12, 1951

Robert V. Lackner
John A. Lozan
Vincent J. Winkle
INVENTORS.
BY Slough & Slough, ATTORNEYS.

INDUCTION FURNACE

Filed Jan. 12, 1951 8 Sheets-Sheet 6

Robert V. Lackner
John A. Logan
Vincent J. Winkle,
INVENTORS.
BY Slough & Slough, ATTORNEYS.

April 20, 1954 R. V. LACKNER ET AL 2,676,234

INDUCTION FURNACE

Filed Jan. 12, 1951 8 Sheets-Sheet 7

Robert V. Lackner
John A. Logan
Vincent J. Winkle,
INVENTORS.

BY Slough & Slough, ATTORNEYS.

April 20, 1954 R. V. LACKNER ET AL 2,676,234

INDUCTION FURNACE

Filed Jan. 12, 1951 8 Sheets-Sheet 8

Robert V. Lackner
John A. Logan
Vincent J. Winkle
INVENTORS.

BY Slough & Slough, ATTORNEYS.

Patented Apr. 20, 1954 2,676,234

UNITED STATES PATENT OFFICE 2,676,234

INDUCTION FURNACE

Robert V. Lackner, Crafton, Pa., and John A. Logan and Vincent J. Winkle, Youngstown, Ohio, assignors to Magnethermic Corporation, Youngstown, Ohio, a corporation of Ohio Application January 12, 1951, Serial No. 205,766

11 Claims. (Cl. 219—10.67)

This invention relates to improvements in induction furnaces of the general type commonly employed for the heating of metal work-pieces, such as billets, bars, or the like, and more particularly such as are of non-ferrous, or non-magnetizable metal, which may be of solid or tubular form and which commonly are uniform cross-sectional form which are successively passed into the furnace, heated therein and discharged therefrom for a subsequent forging or other intended operation upon them, and also relates to electrical and mechanical means and methods for achieving efficient operation of the furnace.

The furnace of the present invention is characterized, as distinguished from other induction heaters of the same class, by the use of low-frequency current to energize the tubular inductor coil unit within which a non-magnetizable metal work-piece is disposed for heating to a temperature below its melting point, such low-frequency being employed because of the greater depth within the material of the work-piece to which such current is adapted to induce heating eddy currents; it is further characterized by the utilization of strong magnetic forces, previously considered to be a highly objectional result of the use of low-frequency energizing currents, for the useful purpose of ensuring the maintenance of the work-piece in a desired efficient longitudinal position with respect to the inductor winding of the unit.

The induction furnace hereof, although not limited thereto, preferably comprises an inductor coil unit consisting of a plurality of longitudinally extending, relatively contiguous, helical induction coil windings, each comprising a plurality of convolutions of copper tubing the convolutions of all said windings being preferably disposed in a single layer, the over-all axial extent of the coil windings preferably being at least equal to the total length of work-pieces, at one time, disposed within said unit; in other embodiments the said unit may have a single winding, of suitable length.

A coolant liquid is continuously passed through all said convolutions, being conducted thereto and therefrom by iron pipes which are preferably so secured together as to afford parts of a rigid supporting frame for the coil unit, and said frame comprising a pair of clamps which securely and rigidly hold all winding convolutions of the unit, in compression.

In a disclosed embodiment of the invention wherein a plurality of induction coil windings, equal in number to the number of phases of a polyphase source of energizing alternating current employed, the different coil windings are each energized concurrently with energization of the others by a current of a different phase of the polyphase alternating current which is of a low frequency, such as 60 cycles per second, and is of a low voltage, such as 110 volts, and the connections to said windings being so made that a travelling field of magnetic flux is produced which is effective to exert a force sufficient to move the work-piece in a predetermined longitudinal direction; a stop member, placed in the path of movement of said work-piece, and adapted for engagement by said work-piece, when exposed to said force, maintains the work-piece in a desired position, within the inductor unit, during the heating period; in the case of single winding inductors the work-piece, initially placed off-center with respect to the winding, is correspondingly magnetically maintained in engagement with a similar stop, for the same purpose.

Passage of coolant liquid through the plurality of induction coil windings, from and to different sections of the pipe frame, ensures that the frame and said coil windings remain sufficiently cool as not to cause burning of an operator's hands should the operator touch the same, during a furnace heating operation.

The different billets or other work-pieces are preferably successively singly disposed within the convolutions of the plurality of coil windings, and as each unheated work-piece is advanced into one end of the coil assembly, a properly heated work-piece is ejected from the other end thereof.

An improved electrical controlling apparatus and system are provided for an induction heating furnace of the general class disclosed herein to effect discontinuance of the period of heating of a billet or other work-piece, whenever its temperature reaches a predetermined maximum value.

The aforesaid electrical system and apparatus also includes means which are automatically operable to resume heating of the work-piece if the operator should unduly delay discharging the billet from the furnace. In such a case, in response to a slight cooling of the work-piece, said means are adapted to automatically and cyclically continue to re-heat and discontinue heating of said billet, within a narrow range of temperatures to maintain the said work-piece heated to a temperature approximating but not exceeding that of the said predetermined maximum temperature, until the attention of the operator shall have been directed to the need to cause said billet to be discharged from the furnace.

Among the objects of our invention is to provide for the successive discharge of properly heated billets, or other work-pieces, from the furnace when the temperature thereof reaches a predetermined maximum.

Another object thereof is to avoid heating by the effects of straying portions of the magnetic field, of the coil-supporting frame.

Another object of our invention is to provide improved temperature controlled means of indication of the temperature of a billet being heated in an electromagnetic furnace, in combination with improved automatically operable means associated with said detecting means, for automatically effecting discontinuance of induction heating of said billet in response to heating thereof to a predetermined maximum temperature.

Another object of our invention is to provide improved controlling means for an induction furnace which is automatically operable to effect cyclically-recurring relatively short periods of re-heating and cooling of said billet or other work-piece within a very narrow range of temperatures which do not exceed that of the aforesaid predetermined maximum temperature should the operator unduly delay to effect discharge of the same from the furnace after the same has initially reached the said maximum temperature.

Another object of our invention is to achieve the aforesaid cyclic re-heating and cooling of the work-piece within a range of temperatures of which the lowest is sufficiently near the said predetermined maximum temperature whereby the work-piece may be caused to be discharged at any time during any such cyclic period, at a temperature which is within a range adapted for the efficient subsequent forging or other deforming operations, to which said work-piece is then subjected.

Another object of our invention is to supplement the temperature indication and the automatic heating cut-off means, aforesaid, by a safety timing mechanism, adapted to cut off the heating electrical current before the work-piece achieves an excessive temperature, if the aforesaid automatically operable means should have failed to operate to effect earlier limitation of the maximum temperature of the said work-piece.

Another object of our invention is to provide an improved means, method, and system for controlling the operation of an induction furnace for the heating of metal billets to a forging, or other desired temperature.

Another object of the invention is to produce a travelling field of magnetic flux, during all periods of inductive heating of a non-ferrous work-piece disposed within the winding convolutions, which is effective to exert a directive motivating force on said work-piece sufficient to cause the same to be in pressure engagement with a stationary stop disposable at an end portion of the heating compartment within said convolutions, whereby the work-piece is maintained in a predetermined longitudinal position therein.

Another object of our invention is to effect a great depth of heating, and uniform distribution of the heating effect, throughout the entire mass of the work-piece, as distinguished from "skin-effect" heating thereof, by which induction heating by high-frequency is characterized.

Another object of our invention is to provide an improved multi-coil induction furnace whose respective coil sections are each energized by current from a relatively different phase derived from a commonly available source of polyphase low-frequency alternating current.

Another object of the invention is to provide for locating a non-magnetizable work-piece in a predetermined position for inductive heating thereof, as the result of magnetic force produced by the magnetic field which results from the energization of the heating inductor of the furnace.

Another object of the invention is to provide a novel electrical system whereby a travelling field of magnetic flux may be produced which permeates the induction heating compartment of a low-frequency induction furnace, and which is effective to directively move a non-ferrous work-piece disposed therein in a predetermined axial direction, to a predetermined position in said compartment, relative to the position of the inductor winding unit surrounding said work-piece.

Another object of the invention is to provide an improved induction furnace construction, wherein close magnetic coupling between the inductor windings thereof, and a metal work-piece, surrounded by said winding, may be achieved.

Another object of our invention is to provide an improved feeding and discharging mechanism for separately supplying work-pieces to the furnace and for discharging the same therefrom.

Another object of our invention is to successively heat billets or like work-pieces to a predetermined temperature in a highly efficient manner, and to effect a continuous indication of the temperatures of said work-piece during the entire period of heating thereof.

Another object of the invention is to provide an improved unitary gate and thermo-couple assembly and improved means to alternately dispose the same in a highly efficient operative position, and in a non-obstructing inoperative position.

Other objects of our invention and the invention itself will be better understood by reference to the following drawings, in which drawings.

Figure 1:
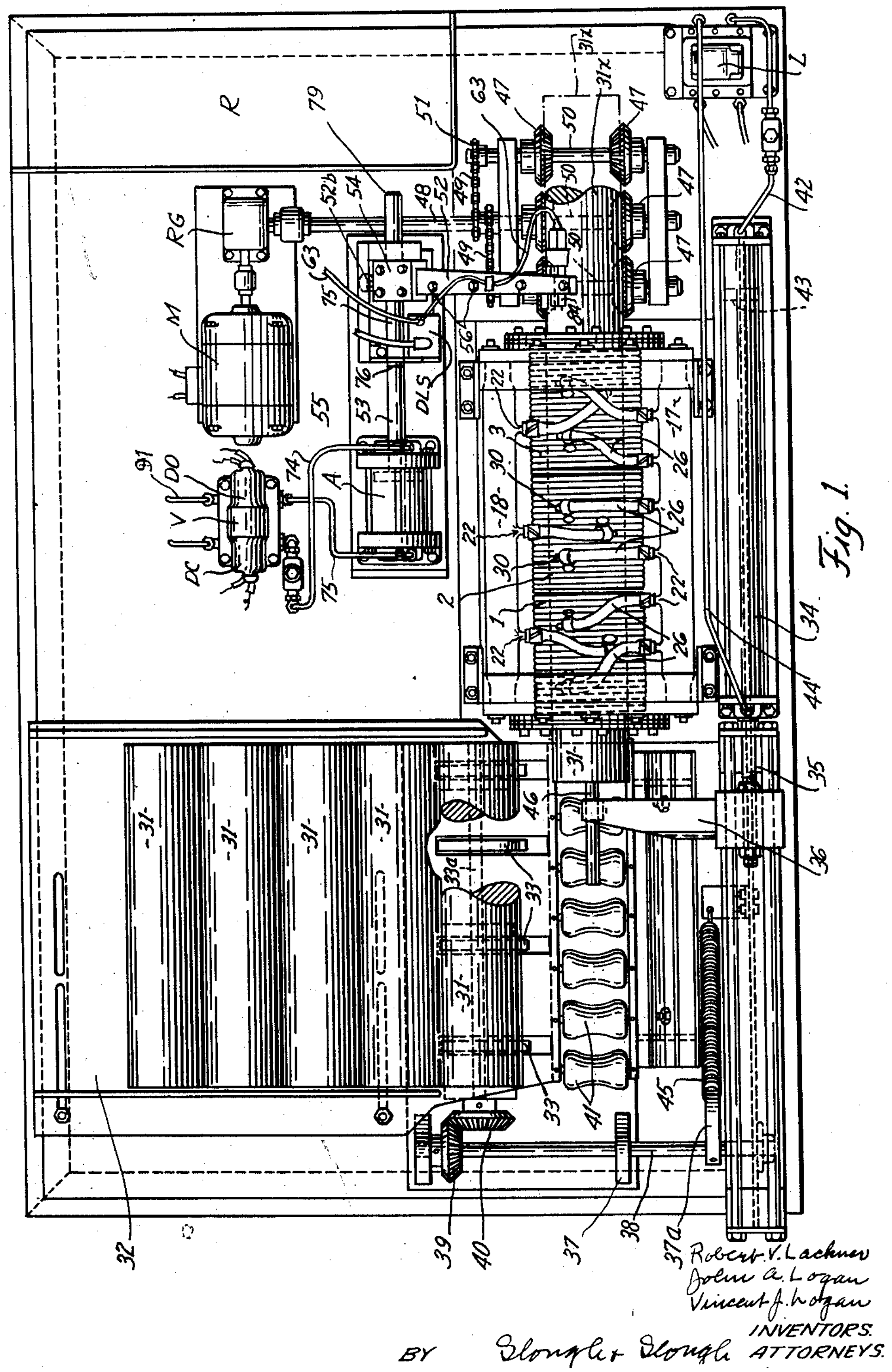
Fig. 1 shows, in plan view, a furnace which is a preferred embodiment of my invention having three coil sections for energization from a source of commonly available three-phase, low frequency current, together with certain ancillary parts.
Figures 2, 2A:
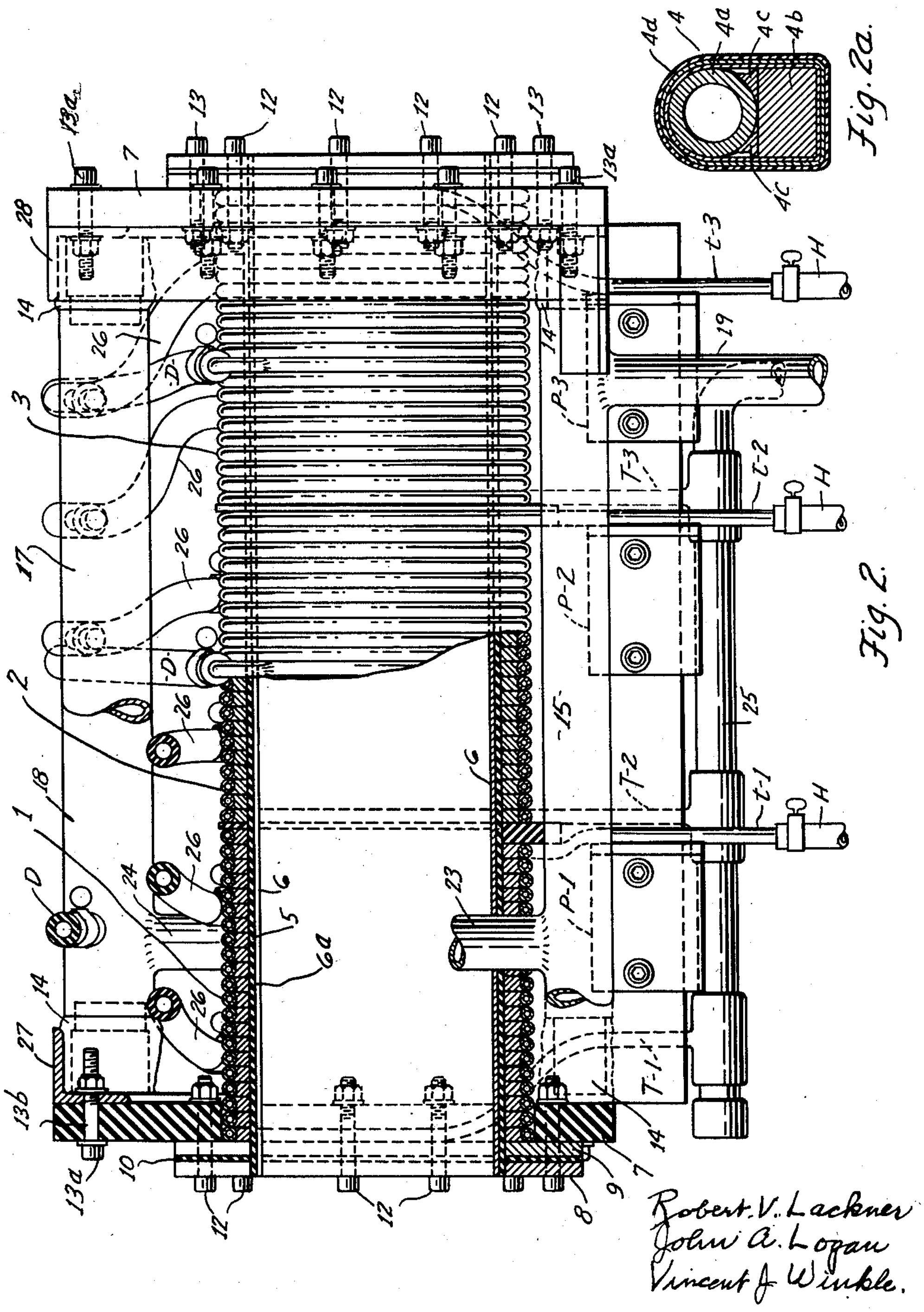
Fig. 2 is a view of the said coil sections and of the supporting frame therefor shown partly in plan and partly in transverse section, together with broken away parts associated therewith.

Fig. 2*a* is a view in transverse section of a liquid cooled tubular coil conductor as employed to form each of the helical coils of Fig. 1.

Figure 3:
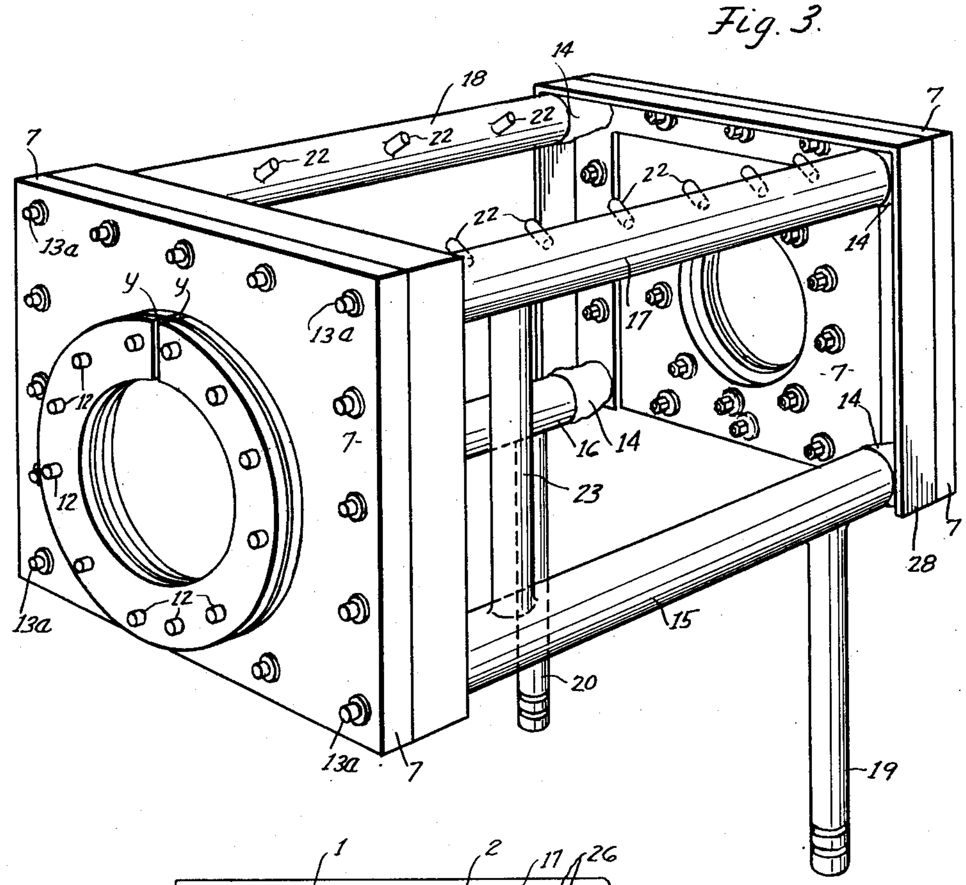

Fig. 3 shows the supporting, and cooling liquid distributing frame, for the three helical induction coil windings.

Figures 4, 6:
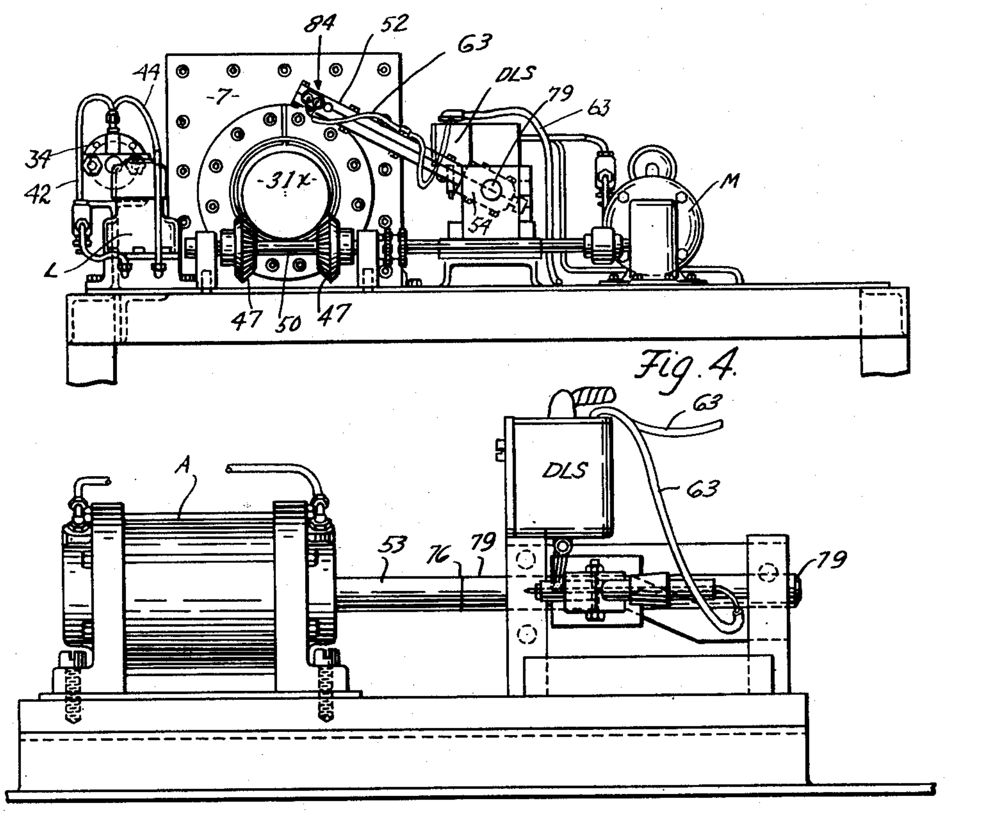

Fig. 4 is an elevational view of certain of the apparatus shown in Fig. 1, the view being taken from the right-hand end of said apparatus as there shown.

Figure 5:
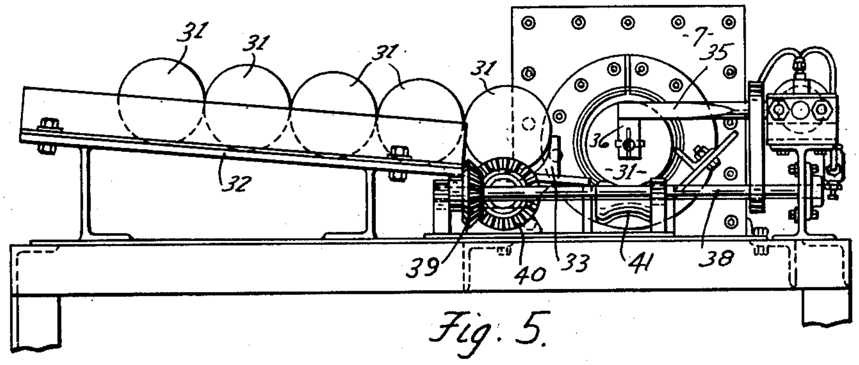

Fig. 5 is an oppositely directed elevational view of the character of that of Fig. 4.

Fig. 6 is a side elevational view showing certain parts located adjacent to, and which are ancillary to, the discharge end of the furnace coil assembly of Fig. 1, and which are shown therein above and to the right of said discharge end of said coil assembly.

Figure 7:
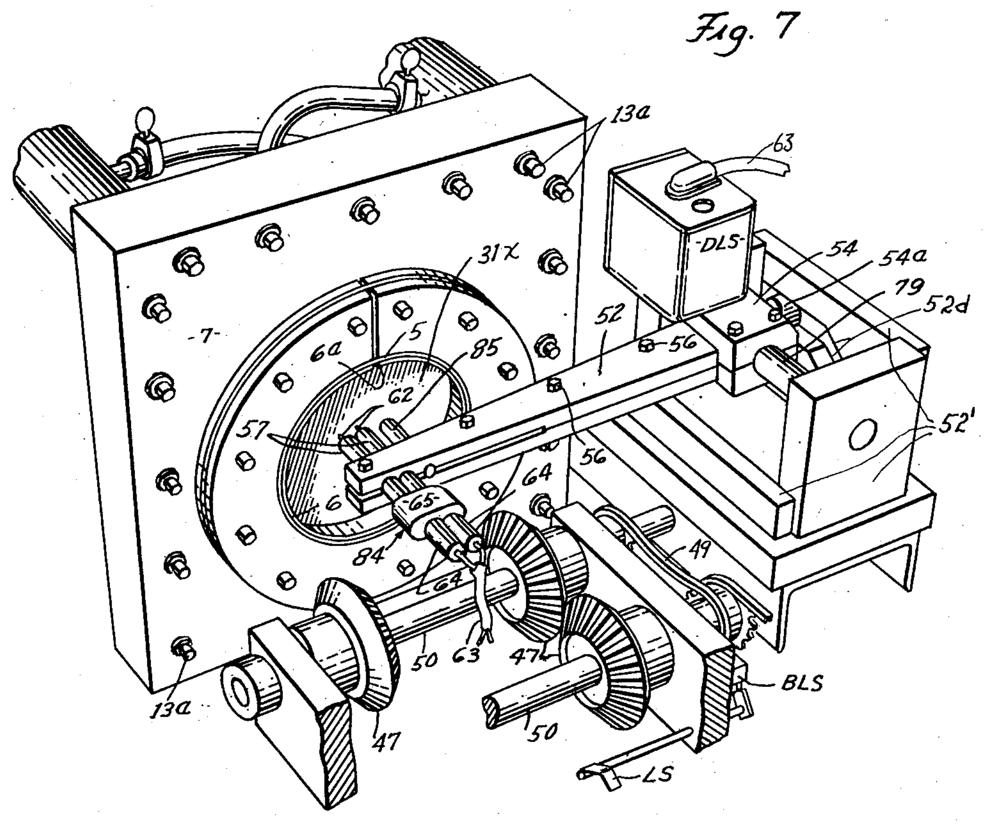

Fig. 7 is an isometric view of the gate, or stop mechanism and a thermo-couple associated with the stop mechanism which are shown in a different position of adjustment in the elevational view of Fig. 4.

Figure 7B:
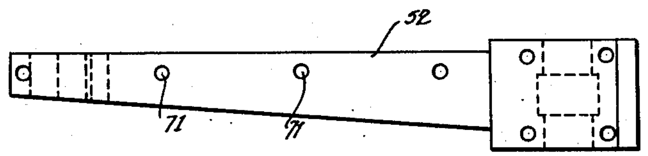
Figure 7C:
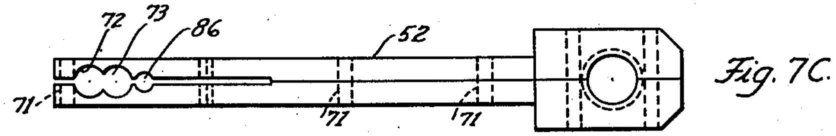
Figure 7D:
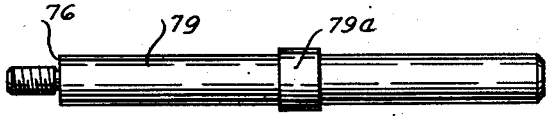
Figures 7A, 8, 9, 10, 10A, 11, 12:
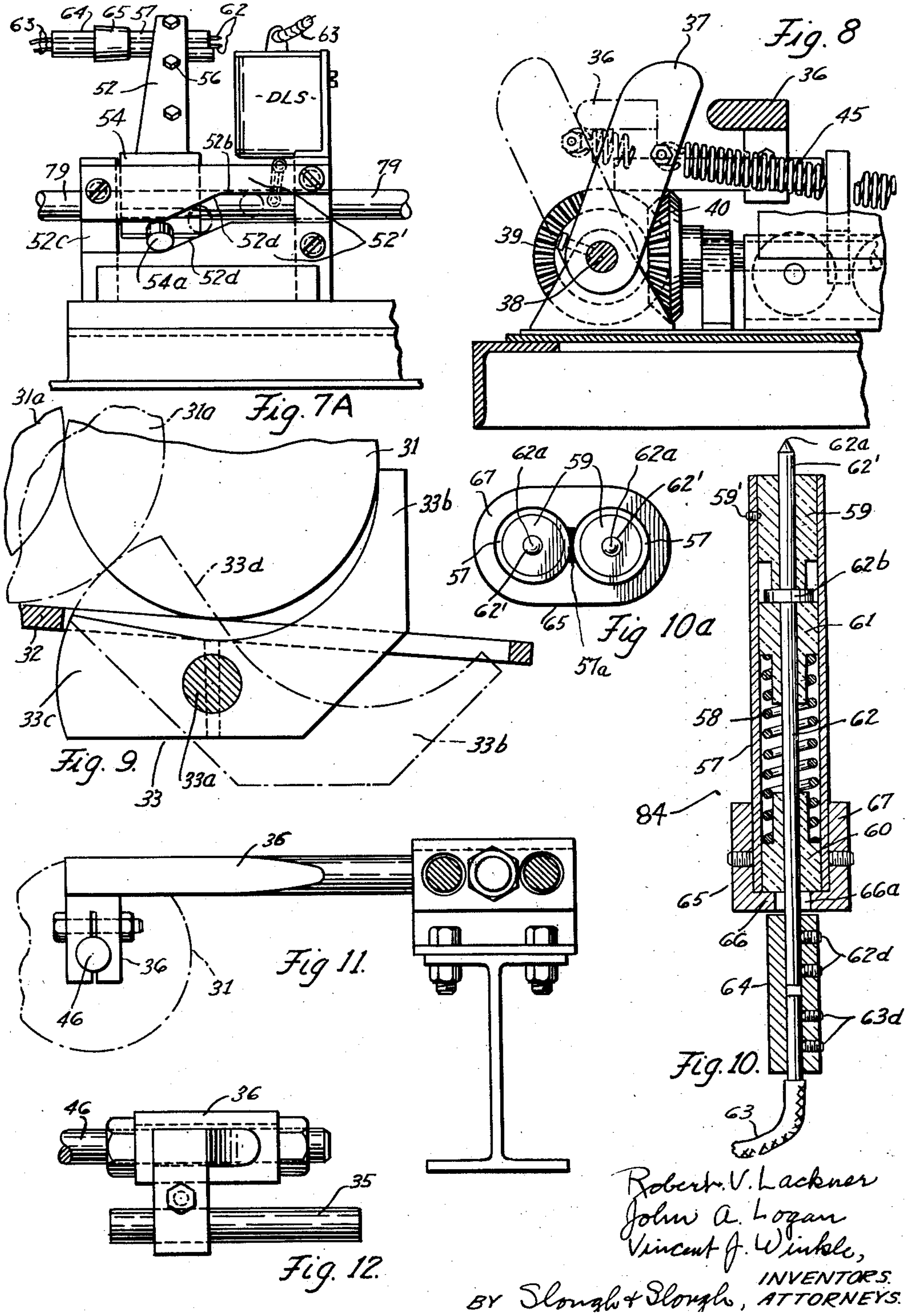

Fig. 7A is a side elevational view of the gate, or stop mechanism of Fig. 7 and parts associated therewith.

Figs. 7B and 7C are respectively top plan and side elevational views of the gate, or stop arm of Fig. 7 together with relatively associated parts.

Fig. 7D is a side elevational view of an extension of a longitudinally reciprocable piston rod of an air-motor, upon which rod the gate, or stop of Figs. 7A, 7B and 7C is carried.

Fig. 8 is a view partly in elevation and partly in vertical section of the apparatus shown at the work-piece feeding end of the apparatus shown at the left side of Fig. 1.

Fig. 9 shows one of four like swingable work-piece feeding arms, in two differently swung positions, by solid and dot-dash lines, two positions of a work-piece controlled thereby, being likewise indicated.

Fig. 10 shows in transverse sectional view one of the like half-portions of a thermo-couple element which is associated with the discharge end of the furnace.

Fig. 10A is a front and elevational view of the complete element, a half-portion of which is shown in Fig. 10.

Fig. 11 shows, in end elevational view, elements of the in-feed ram mechanism employed to longitudinally force a cold work-piece into the heating compartment of the furnace.

Fig. 12 is a side elevational view of a detail later described.

Figure 13:
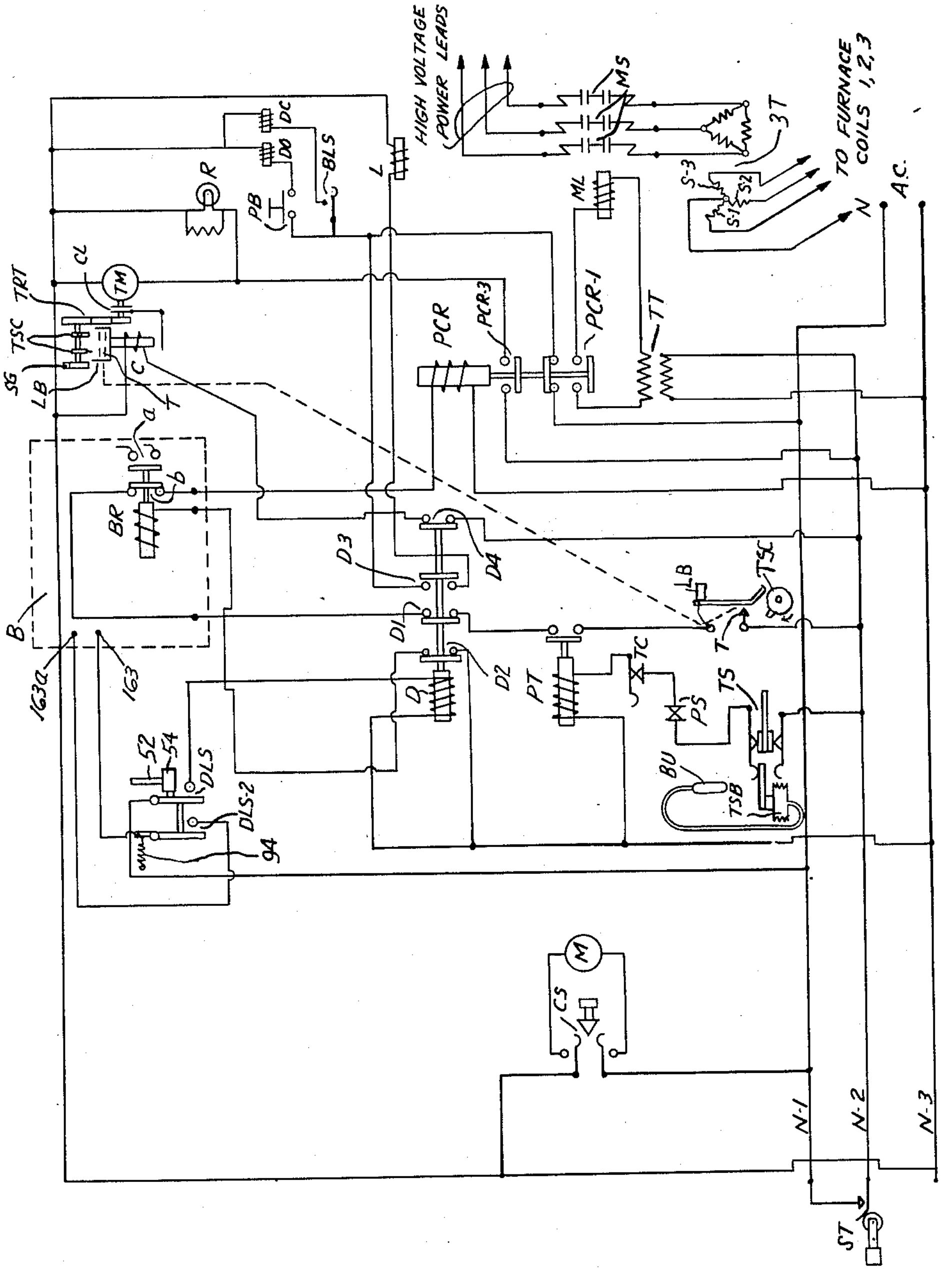

Fig. 13 is an electrical diagram indicating electrical circuits and electrical controlling and controlled appliances which are employed in the herein disclosed embodiment of our invention.

Figure 14:
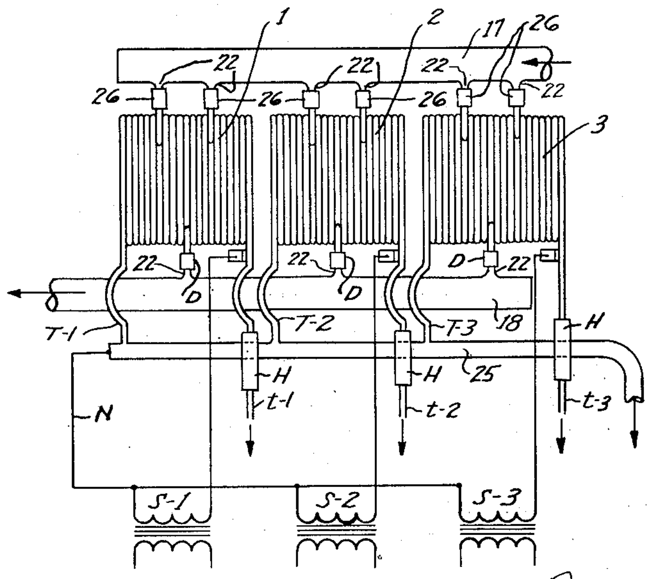

Figure 14 is a diagram of certain paths of flow of the cooling liquid employed for the cooling of the furnace induction coils.

Figures 15, 16:
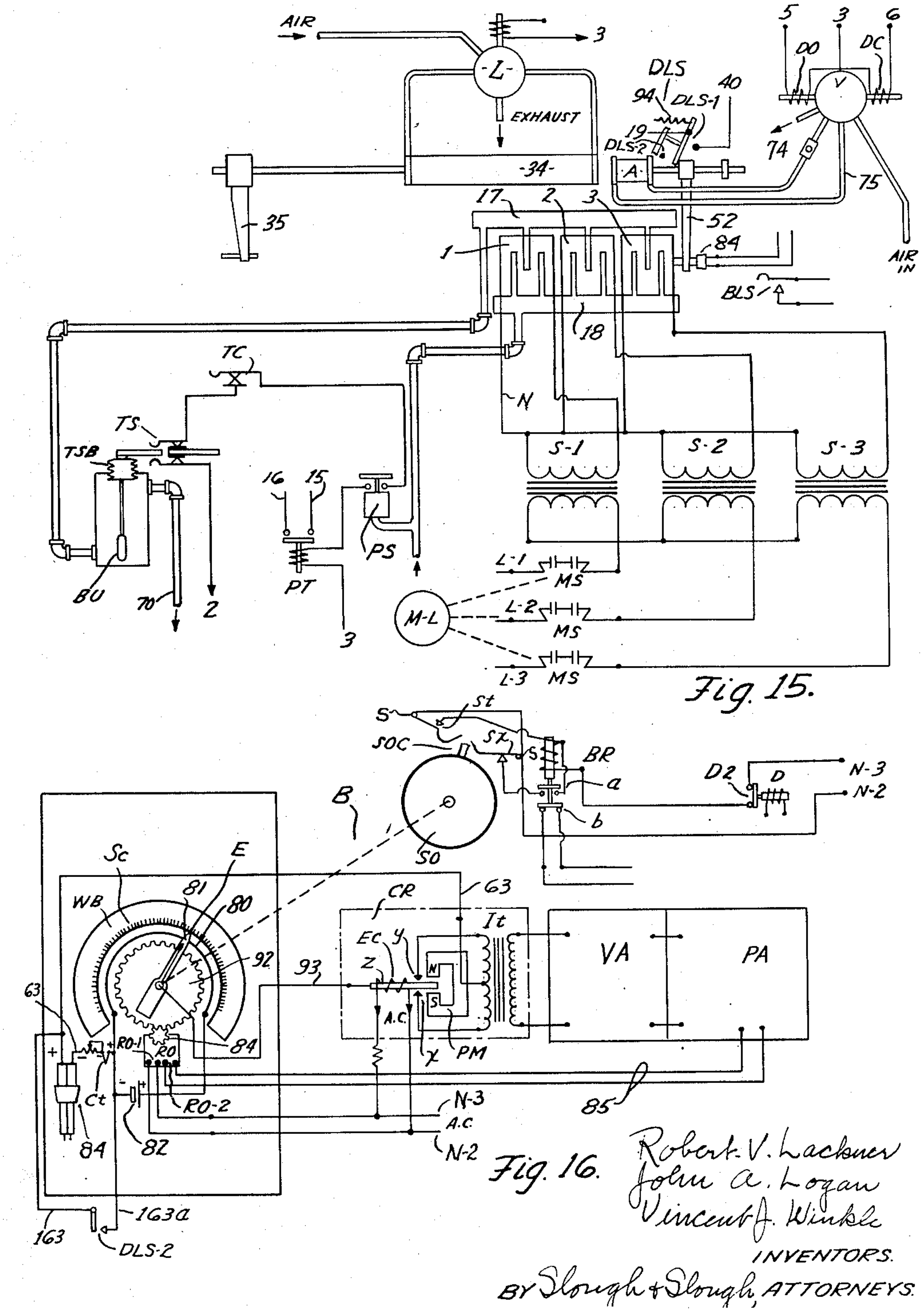

Fig. 15 is a schematic diagram wherein certain electro-responsive devices, and certain hydraulically actuatable appliances are indicated in their association with electro-responsive controlling apparatus, and also indicates electrical circuits associated with said devices and apparatus.

Fig. 16 is a schematic diagram of portions of a balancing potentiometer mechanism, by which operations of the furnace are adapted to be controlled.

Referring now to the drawings which show a presently preferred embodiment of the invention and, in different figures of which, corresponding parts are indicated by like reference characters, the induction coil assembly, as shown in Fig. 1, comprises three sections 1, 2 and 3, which later herein are referred to as the complete furnace coil assembly 123, each of the sections being in the form of a single helical layer of a tubular electrical conductor 4, which is formed by corresponding lengths of copper tubing 4*a* and a copper bar 4*b* placed in contiguous lateral relation thereto, the outer surface of the tube, at one side thereof, and an adjacent flat side portion of the bar being integrally bonded together by brazing material 4*c*. The exterior surface of the conductor 4 is preferably covered by two layers of glass-fiber insulating tape, and an outer layer of insulating varnish 4*d*, the latter providing a smooth outer protective surface for the conductor.

The integrally united tube 4*a* and copper bar 4*b* are preferably first given the form of a helix by being wound, while heated, on a solid cylindrical steel bar form, the temperature of said copper tube-and-bar conductor being such as to effect pliability of the copper material, and to ensure that the form of the helix will be substantially maintained upon subsequent cooling, and when removed by sliding the same from the steel bar form.

The tape coverings and varnish are best applied to the helical wound coils after these are taken from the winding form and the ends of each of the formed coils are bent outwardly for electrical and water-cooling connections, which are later made as herein later set forth.

The three formed and insulated coils are then placed end-to-end on a somewhat longer cylindrical tube, comprising an outer cylindrical layer 5 of heat and electrical insulating material such as glass fiber board, micanite, or mica, each of which is impervious to moisture, and an innermost tubular foundation which is provided by a stainless non-magnetizable steel tube 6, which is longitudinally split as at 6*a*, Fig. 2, from end to end, and so unitarily mounted, the coil unit is ready for application to the supporting pipe frame of Fig. 3.

The pipe frame, shown best in Fig. 3, comprises four longitudinally extending horizontal pipes, which are relatively parallel and comprise a pair of uppermost pipes 17 and 18, and a pair of lowermost pipes 15 and 16, each secured, by its opposite closed end portion 14, within oppositely disposed corresponding corner portions of a pair of angle-iron quadrilateral end frames, 27 and 28.

Each of said pair of angle-iron frames comprises four angle-iron elements, welded together at their meeting ends, and each affording, by its outer end-flange, a mount upon which one of a pair of insulating end boards 7 may be secured by bolts 13, and 13*a*, passed through said boards and aligned apertures of the respective radial flanges 27*a* and 28*a* of the end frames 27 and 28.

Each of the relatively superposed pair of pipes 17—15 and 18—16 are relatively interconnected by duct pipes respectively at 23 and 24, Fig. 2, the duct 23 being more clearly shown in Fig. 3.

Respectively, inlet and discharge pipes 19 and 20 extend pendantly from the lowermost pipes 15 and 16 of the said pipe frame. Pipe fittings 22 project from each of the upper pipes 17 and 18 to adapt said pipes for branching hose-connections as later described.

Each of the aforesaid insulating end boards 7, which are preferably of fibre-glass laminate, or equivalent insulating material, have a large central aperture whose diameter is only slightly in excess of the outside diameters of the convolutions of the induction coils 1, 2, and 3, whereby different of said boards 7, may be protectively telescoped over the end-most convolutions of the respective coils, 1 and 3, and rigidly secured to the pipe frame, by bolts 13 and 13*a*, as previously described.

Restraint of convolutions of the coil assembly 123, against vibrational or other longitudinal movements, which otherwise results when the coils are energized by the relatively low-frequency current, is afforded by the rigid pipe frame, the heavy end boards thereof, and by steel clamping rings 8 and 9, each split at *y*, and between the latter there is interposed an insulating ring 10, a set of the said rings being bolted to each end board 7 by bolts 12, each set of said rings 8, 9 and 10 functioning as a reinforcing collar for the coil.

The bolts 12 and 13a, when tightened, cause the pair of plates 9 to be tightly and rigidly clamped against the endmost of the convolutions of the coil unit 123, to hold all of said convolutions in compression between said plates, to prevent destructive movement otherwise resulting from the effects of the heavy alternating magnetic field which is produced by the flow of the heavy electrical currents of low frequency, through the inductor coil windings.

The current supply for energizing the inductor coil windings is preferably derived from a three-phase, 60 cycle, high voltage power line, having three conductor mains which are preferably passed through switch means, ML, to the primary windings of suitable transformer means, of which a polyphase type is indicated at 3T, in Fig. 13, or as indicated in Figs. 14 and 15, the transformer means may comprise three separate single phase transformers such as those shown at a, b and c.

The respective convolutions of the three inductor windings 1, 2 and 3, are wound in the same circuitous direction on the outer surface of the non-magnetizable, longitudinally split, stainless steel tube 6, and in the same longitudinal direction, to jointly provide a single layer of inductor convolutions.

As viewed, particularly in Figs. 2 and 14, these windings each extend from a left-hand terminal, which respectively, is T-1 for winding 1, T-2 for winding 2, and T-3 for coil 3, towards the right where their respective "live" terminals are, in turn, shown at t-1, t-2 and t-3; all said left-hand terminals are, in common, connected to ground, via the water pipe 25, to which, also, the left-hand terminals of the three secondary windings S-1, S-2 and S-3, of the three single phase transformers a, b and c, are, in common, connected, as shown in Fig. 14. The "live" terminal of each transformer secondary winding, is at the right end of each thereof, and is connected to the right-hand, or "live" terminal of its operatively related inductor winding, to which the said transformer secondary directs energizing current; thus the "live" terminals of respective of the said secondary windings S-1, S-2 and S-3 are respectively connected, in order, to the "live" terminals of respective of the inductor windings 1, 2 and 3, in the same order of left-to-right succession.

In this preferred manner, when currents of different of the three phases are separately, in the order of their relative phase sequence, respectively applied to the respective transformer primary windings, P-1, P-2 and P-3, a left-to-right "travelling field" of magnetic flux is inevitably produced which extends interiorly of the elongated inductive heating compartment of the furnace, which is afforded by the tube 6; also the inductive heating, eddy-current, effect of the three energized windings 1, 2 and 3, is efficiently cumulative. The transformers step-down the voltage in each secondary winding, S-1, S-2 and S-3, to a low voltage, such as 110 volts.

The term "travelling field" is here employed in much the same manner that the term "rotating field" is used in connection with polyphase induction motors, which depend, for their operation, upon an analogous disposition of, and energization of, different stator windings, by currents of successive phases, to effect a directive rotational movement of the rotor.

In order to maintain the coils 1, 2 and 3, at low temperature, water is continuously directed by each of a plurality of rubber tubes 26 from the pipe fittings 22 of the inlet pipe 17 to, and through, the interior of the copper tubes 4a (Fig. 2a) which comprises a large part of the integral copper conductors 4.

Cooling water is supplied to pipe fittings 22 from such a conveniently located dispensing element as the pipe 17, to which said water is supplied through the conduit 19, the pipe 23 and the duct 24, from a convenient source of cooling water.

Water introduced into the interior passage of each of said coils, may be, as shown, introduced by substantially T-connections at such points, in the length of each coil as are shown in Fig. 1, where certain of the T-connections are shown as being made by an inlet nipple 30 which extends outwardly from the outer wall portion 4e of the conductor 4, and a hose connection 26 joins the pipe 18 with said nipples 30. As shown in Fig. 14, water may be discharged from the two ends of each of the coils, either to a common discharge pipe, such as that at 17 and/or may be supplementarily discharged to different of a plurality of discharge pipes such as those at 25, t-1, t-2, and t-3 howsoever the water flow is directed; it is mainly important to maintain reasonably rapid flows of coolant water through the entire length of all coils 1, 2 and 3, at all times during which said furnace coils are energized.

Corresponding terminal ends, t-1, t-2, and t-3, of said coils, 1, 2 and 3, are conveniently led to the horizontally extending supplemental water discharge pipe 25, which in the portion adjacent the coil is of metal tubing and are all so connected thereto, so as to make a tube and pipe connection to permit discharge of cooling water from the said coil ends into and through said pipe, and by such same connections the said coil end terminals may also be preferably electrically connected to the said pipe 25.

As shown in Fig. 14, the pipe 25 is electrically connected to a common terminal N for one side of each of the three transformer secondary windings. A connection from the relatively opposite ends terminals, t-1, t-2, and t-3, for the respective coils, 1, 2, and 3, to the live terminal of each of the said secondary transformer windings is preferably effected by the provision of a rather narrow terminal board which is preferably of glass laminate material, on which a series of relatively interspaced copper terminal plates P-1, P-2, P-3, are secured, and to which the respective terminal coil ends, t-1, t-2 and t-3, are respectively connected, preferably by brazing the lateral surface of each of the hollow conductor (4) terminals, t-1, t-2, and t-3, to the respective copper terminal plates, P-1, P-2 and P-3.

Electrical circuit conductors, extended from the live terminal of each of the respectively different secondary transformer windings, S-1, S-2 and S-3, to the respective plates P-1, P-2 and P-3, completes the electrical circuits for simultaneously energizing each of the heating coils, 1, 2, and 3, by current flows, each of which is of a relatively different phase from that passed through the other coils, the phases of the respective flows in the order of their phase sequence, being directed through the coils 1, 2 and 3 respectively in the order of their relative placement, in order, proceeding from coil 1, which is most remote from the discharge end of the heating compartment 123, to the coil 3 which is nearest to the discharge end of the heating compartment; in the disclosed embodiment current flows of all phases are directed by said coils in the same circuitous direction.

The current flows are preferably so correspondingly directed through the three heating coils, that the electromagnetic torque or drag, which is exerted upon a metal billet or other work-piece of like cross sectional form throughout its length and which corresponds to the total length of the three coils, is cumulative to tend to force the article from the discharge end of the coil furnace and during operation of the furnace said work-piece is restrained from such discharge movement, preferably in the manner as later herein described, wherein a discharge gate 52 obstructs the discharge path of the work-piece.

The divided water flows through the coils are preferably circuitous, the water discharged from the coils being conducted by appropriate conduits to a common water-cooling heat exchanger according to well-known heat-exchange principles; at D, 26, and K in Fig. 2 and also diagrammatically at Fig. 14, the cooling water rubber hose connections are shown interposed in water lines, to prevent flows of electrical circuits from the coils to pass to extraneous parts of the water cooling system.

The longitudinally extending gap or seam 6*a* of the steel tube 6, and the gaps *y* in the steel rings 8 and 10 are affected to substantially prevent circuitous induced currents in said tube 6 and said steel rings, which otherwise would cause said tube and rings to be heated, to impose a personal hazard for the operator, and cause a reduction in the electro-thermal efficiency of the furnace.

The furnace comprises, in addition to the induction heating coils 1, 2, and 3, and the ancillary water-cooling equipment described, work-piece feed apparatus, work-piece discharge mechanism, temperature indicating and controlling means, a furnace gate element ancillary to the said apparatus, and other controlling mechanism and means, which will be later described.

The work-piece feed apparatus preferably employed for work-pieces which have a generally cylindrical form, such as do the aluminum alloy billets shown in Figs. 1, 4 and 9 at 31, involves an inclined roll-way or chute, 32, which may be of widely varying length, and down which the billets may roll under the control of the four billet holding cams, which are in the form of swinging lever arm elements 33.

The cams 33 are rigidly secured onto a cam-shaft 33*a* which is rotatively reciprocable over a swinging angle of approximately 45 degrees, as a result of a longitudinally directed thrust effort imparted by a laterally extending arm 36 of a reciprocable piston rod 35 of an air motor 34, upon a lever arm 37 secured to shaft 38, rotative reciprocation of said shaft 38 being communicated to the cam shaft 33*a* through the bevel gears 39 and 40, the latter being affixed to an end portion of said cam shaft 33*a*.

A retracting spring 45 having its movable end affixed to a lever arm 37*a*, also secured to the shaft 38, effects reversed swinging movement of the shafts 38 and 33*a* and said cams 33, in response to oppositely directed retractive longitudinal movement of the piston rod 35 of the air motor 34 which effects a retractive movement of the piston-rod arm 36 to cause the arm 36 to become disengaged from the lever arm 37 of the shaft 38.

Alternate swung positions of the swingable cams 33 are shown in Fig. 9, wherein the initial and alternate positions of a pair of billets 31*a* and 31, and also of the four said cams which are relatively laterally interspaced and disposed in tandem for like concurrent movements, are respectively shown by solid and by dotted lines.

The solid lines of Fig. 9 show a succession of billets 31, disposed transversely between the laterally disposed upwardly extending vertical flanges of the angle iron elements 39, whose lower horizontal flanges support the smooth inclined floor of the chute 32, and with the most forward and lowermost of said billets in engagement with the end portions of the concavely curved forward edges of the longer arm 33*b* of the cams 33, to restrain downward gravity-induced movement of the billets.

By the dotted lines in Fig. 9, the cam element 33 is shown as swung by the shaft 33*a* to a position which, in the clock-wise direction, is 45 degrees in advance of the solid line position to depress its long arm 33*b*, thus releasing the most forward billet 31, which then rolls down the chute floor 32, being additionally engaged by the then forward edge 33*d* of the short arm 33*c* of the cam element, to ensure forward gravitational movement of the said foremost billet, which comes to rest on the free rollers 41 which are medially of least diameter.

A gate arm 52 is provided to obstruct or permit the passage of a billet from the heating compartment of the furnace which is defined by the metallic split-tubular lining 6 of the coil assembly 123 and preferably comprises upper and lower halves which are shown in Figs. 7, 7B and 7C, said halves being secured together by bolts including those at 56 passed through openings 71, Fig. 7B, and said halves are so formed as to provide means for clampingly receiving a thermo-couple assembly 84, best shown in Fig. 10.

The gate arm 52, preferably comprises a hub portion 54 which is journalled on an extension 79 of a piston rod 53 of the air motor A, Fig. 6.

The rod extension 79 has an intermediate enlargement 79*a*, which is received in a correspondingly enlarged portion of a transverse bore of the arm hub 54. From the hub 54 a cam-follower projection 54*a* projects rearwardly, and is disposed between the upper and lower relatively interspaced and parallel camming surfaces 52*d* of a stationary frame element 52′. The surfaces 52*d* have horizontal land portions at their ends and intermediate inclined portions which extend upwardly.

As a result of this construction the free end of the arm 52 is elevated or lowered whenever the piston rod is longitudinally moved, respectively towards the right or left, as shown in Fig. 7A, said arm being vertically swingable on the bearing portion 79*a* of the piston rod extension 79.

The gate arm 52, with the stop-rod 85 carried thereby, is therefore adapted to take the approximately horizontal position shown in Fig. 7 which shows the most forwardly disposed ends of thermo-couple prongs 62 of the thermo-couple unit 84 which is carried at the free end of the arm 52, in engagement with the end of a billet 31*x* which at the time is maintained in an efficient longitudinal position within the coil unit during the process of heating, as the result of engagement of said billet end with the free end of the stop-rod 85.

The thermo-couple assembly 84 comprises a cup-shaped element 65, having an end wall 66, and having side wall portions 67 whose inner surfaces are of such oval contour as to tightly receive the inner end portions of a pair of laterally contiguous and relatively parallel steel tubes 57 which are telescoped under pressure within the cup recess defined by said side walls, said tubes having their inner ends abutted against the end wall surface of the cup recess; closely contiguous outer surfaces 57*a* of two tubes 57 are preferably brazed together prior to fitting said tubes to the cup 65.

The forward ends of each of the tubes 57 contain a fibre-glass laminate, axially bored, insulator sleeve 59, which is rigidly held in place by a set screw 59'.

A helical spring 58 surrounds the middle portion of each prong 62 being held in compression between the two fibre-glass laminate bushings 60 and 61 whose relatively opposed reduced end portions are contained within the ends of the spring, and whose relatively enlarged bases are respectively engaged with the end wall surface of the cup recess and with the rear face of a collar 62*b* rigidly secured to the prong, which in turn is backed by the innermost end of the insulator 59.

Each of the prongs 62, disposed within the respective tubes 57 are provided with a pointed forward tip 62*a*, extends rearwardly successively through axial bores of the insulator 59, the relatively loosely fitted bushing 61, the bushing 60, being then passed rearwardly through one of the large apertures 66*a* of the cup end wall 66, and terminates rearwardly thereof.

One or the other of a pair of metallic terminal tubes 64 is secured onto the rear end portion of each prong 62 by set screws 62*d*, and an end of each of a pair of electrical circuit conductors 63 is similarly secured within the bore of a different of said connector tubes 64, by set screws 63*d*.

The prongs 62 extend in parallel relation outwardly beyond the forward ends of their respective tubes 57 and are relatively laterally close together, and, as an example, the lateral interspacing of said prongs and more importantly their points 62*a* may preferably be of the order of ½ to ⅝ inch, and their forward outward extent may be about ⅜ inch.

Each of said prongs 62, together with the associated insulator 61, are together longitudinally reciprocable as a movable unit, in one direction in opposition to the effect of the associated spring 58 and oppositely in response to pressure exerted thereby, and in the latter case, the retractive forward movement is stopped by engagement of the lateral flange of the prong with the rear end of the fixed insulator 59 through whose bore the forward end 62 of the associated prong is reciprocable.

Each of the rearmost end portions of the prongs 62 extend rearwardly through the end wall 66 of the cup shaped holder 65, and are respectively passed into the bores of different of the metal tubes 64, being rigidly secured therein by set screws 62*d*, and rearwardly thereof set screws 63*d* afford means to electrical circuit conductors 63.

The parts of the gate arm 52, the rod 79, the thermo-couple assembly 84, and an abutment rod 85 may be conveniently assembled by depositing the rod 79 in the transverse groove 54*a* of the hub portion of a lower of said arm halves, with the enlarged mid-portion 75*a* fitting within the concentric deeper and narrower groove 54*b* thereof, then by placing the bi-tubular forward portions 57 of the thermo-couple assembly 84 within the adjacent transverse grooves 72 and 73 of said lower arm half, and the abutment rod 85 within the grooves 86 thereof.

Then the upper arm half is placed over the lower arm half, with the grooves of each in vertical alignment, and bolts 56 are passed through aligned sets of holes 71 of the two arm-halves, and nuts 71*a* being applied at the opposite end of the arm to the ends of the bolts, and being turned tightly thereon, the assembly is complete. The threaded end 77 of the rod 79 is then tightly united at 76 with a socket end of the piston rod 53 of the air-motor A to cause the rod 79 which carries the arm 52 and on which said arm is swingably journalled to function as a swingable extension of the longitudinally reciprocatable piston rod 53 of the air motor A; the cam follower 54 is secured to the rear portion of the gate arm 52 in any suitable manner, as by welding it to either of the gate arm halves.

The end portions of the halves of the gate arm 52 are slightly separated, to afford the arm ends 70*a* and 70*b* a certain flexibility whereby when the bolts 56 are projected through the aligned pairs of openings 71 and 71*a*, the gap 70 can be narrowed to cause the arm portions 70*a* and 70*b* to securely grip each of the pair of parallel tubes 57 of the thermocouple 84 (Fig. 10) when these are placed between the arcuate jaws 72 and 73 of the respective arm halves. The arm 52 carrying the thermo-couple assembly 84 of Fig. 10 is shown in a rearwardly retracted uppermost adjusted position in Figs. 1, 4, and 7*a*, is shown in an operative lower forward position in Figs. 6 and 7.

From the drawings and foregoing description, the opposite inoperative and operative positions of the arm 52 are afforded by longitudinal thrust and retractive movements of the piston and piston rod elements 55 and 53, respectively, and like consequent movements of the arm carrying rod 79, whereby the rearward cam follower projection 54*a* of the arm traverses the cam guide surfaces 52*d*, from one to the other horizontal lands surfaces over intermediate inclined portions of said cam surfaces. Operative positioning of the arm is affected when the projection 52*c* is engaged with surfaces of the upper land, thereby lowering the thermo-couple unit of Fig. 10, which is carried by the arm end to a position where the prong ends 62*a* make indenturing engagement with the end surface of a hot billet, as shown in Fig. 7, until the free end of the gate abutment rod 85, which is carried by the gate arm 52 makes abutting engagement with the end of the billet, thereby limiting the degree of indenturing of the billet by said prong tips 62*a*, which are engaged with said billet end. The free end of the rod 85 is so positioned with respect to the coil unit 123 as to afford a stop against further forward movement of the billet or other work-piece.

As hereinafter more fully set forth, forward and lowering movement of the gate arm 52 to its operative position shown in Fig. 7 is attended by engagement by the hub portion 54 of said arm with the operating lever of a 2 pole switch DLS, to cause each of two sets of normally closed contacts to be simultaneously broken. A retractive spring 94, Fig. 13, is effective to restore the contacts of both sets to normal closed condition, when the arm 52 is retracted to a relatively rearward and uppermost position.

When a billet in the furnace has been heated to the desired temperature, and is electromagnetically caused to exert a considerable pressure against a gate projection 85 carried by a gate-arm 52, said projection being in obstructing relation to the discharge of said heated billet and having been effective to maintain the billet during the heating period in a predetermined inductive heating position, it is first necessary to displace said gate-arm from the path of discharge of said billet before the heated billet may be discharged and a new cold billet substituted.

This is preferably achieved by manual operation, by the attendant operation, of a push button switch PB whereby the gate-arm is simultaneously elevated and retracted out of the discharge path of the heated billet as a result of energization of a solenoid electromagnet DO of a magnetically controlled 4-way valve V, whereby air pressure is so directed by said valve through a duct 75 to the air-motor A to cause it to thrust its piston and its piston rod 53 to the right, as in Fig. 1. As previously described, such movement of the piston rod 53 is effective to move the gate-arm 52 rearwardly and upwardly from the position shown in Fig. 7 to its inoperative position of Figs. 1, 4, and 6, and the furnace is shut down by means elsewhere herein described.

The valve V shown in Fig. 1 is of the well-known so-called 4-way type wherein the operative valve elements of V, and consequently the gate arm 52, are shiftable from a first to a second operative position wherein the gate arm takes the position shown in Figs. 1, 4 and 7A, as a result of momentary energization of the electromagnetic solenoid indicated at DO, and remain in said second operative position until, by momentary energization of the second solenoid DC, the operative valve elements are restored to the said first position to remain so adjusted until the said first solenoid is again momentarily energized. Reversed positioning of the valve elements of V, by passing compressed air from said duct 91 to the alternate duct 75 to shift the gate-arm 52 to its operative position shown in Fig. 7, is effected by momentary energization of the solenoid DC.

A limited degree of forward movement of the arm 52 which accompanies forward movement of the follower 52c along the upper cam land surfaces 52b causes the thermocouple prong tips 62 to first engage the leading end face of the hot billet which maintains said prongs, the insulators 59 and 61, and the rearmost tubes 64 and rear prong ends stationary, thus yieldably, by compression of the springs 58, separating the rearmost tubes 64 with all contained parts from the said forward elements of the thermo-couple assembly.

The indenturing engagement by the tip portions 62', of the thermo-couple prongs 62, which are respectively made of different metallic materials, which have substantially different thermo-electric properties with respect to the relative potentials created in them, when they are simultaneously engaged with a heated billet of aluminum or such other billet material, is effective to create a potential in one of said prongs which is positive with respect to the thermo-electric potential of the billet, and a potential at the other prong which is negative with respect thereto.

According to well known physical phenomena, the difference in potentials increases, as the billet and prong tips become more highly heated, and a resulting electric potential, which is set up on a closed circuit which includes said prongs and the billet material will be correspondingly increased in value, and apparatus such as that at B, indicates the temperature of the billet at said prong tips 62', and is provided with means operative at a predetermined maximum temperature to ensure that said maximum billet temperature is not exceeded.

The temperature of any billet being heated in the furnace may thus, at all times be shown by an electrically actuated indicator hand or pointer 81, which is preferably associated with a self-balancing potentiometer instrument B, of the well known type manufactured by the Brown Instrument Company, which is relied upon to control the duration of heating of the billet, to whatever period of time is required to heat the billet to a predetermined desired maximum temperature, said instrument operating automatically to prevent such maximum billet temperature from being exceeded.

The primary elements of the instrument B which are effective to achieve the balancing and indicating result are schematically indicated in the diagram of Fig. 16, which discloses a Wheatstone bridge slide-wire resistance 80, which may, as shown, extend as an arc of a circle, and which is oppositely traversable by an arcuately reciprocable contactor 81, said resistance wire being abridged by a standard battery cell 82 of low voltage.

That one of the pair of conductors 63 leading from the pair of thermo-couple prongs 62' which is at a relatively negative potential relative to the thermo-electric potential of a heated metal billet which at the time is engaged by the prongs, is shown as leading to that end of the multiply-connected battery cell 82 and slide-wire resister 80, which is shown as also being at negative potential.

At *Cr*, enclosed by a dot-dash line, is shown a vibrator type of converter having an electromagnetic coil Ec which is energized preferably from the same source of 60 cycle current which separately is applied to one winding of the motor RO to cause an armature *z* to vibrate between so-called "north" and "south" poles of a permanent magnet P*m*, the actual arrangement being such that said armature will alternately engage one or the other of the stationary electrical contacts *x* or *y*.

The aforesaid convertor vibrator may be of the type disclosed in United States Letters Patent No. 2,423,524 to Frederick W. Side, dated July 8, 1947.

The contacts *x* and *y* are respectively connected to opposite terminals of a split primary winding of the input transformer I*t*, whose central point is connected by a conductor 63 to the relatively positive terminal of the thermo-couple prongs 62'. The converter armature *z* is connected by the conductor 93, to the slide contactor 81 which carries a pointer E, which is reciprocably movable over a temperature indicating scale Sc. In operation, the conductors 63 and 93 lead a undirectional current, which may result from any difference of relative direct current potential communicated to respective said conductors from the standard battery $B_2$ and the thermo-couple prongs, and as modified by the position of the contactor on the slide wire 80, alternately, to the primary windings of the transformer I*t*.

The Wheatstone bridge circuit of Fig. 16 affords means of balancing a pair of opposed direct current potentials comprising that supplied by the battery cell 82 which is of constant value, and that supplied by the thermo-couple unit whose potential varies according to the temperature of the billet with which the thermo-couples are engaged.

The balance of opposing potentials is achieved by movement of the contactor 81, which is effected by the motor RO, to some intermediate point on the slide wire 80, at which the voltage drop across portions of the slide wire is such that the direct current potential between the contactor E and the negative conductor 63 is equal to that between said contactor E and the positive terminal of the standard battery 82, whereby no current traverses the conductors 63 and 93 leading to the converter CR and transformer *It*.

As the electrical potential existing between the thermo-couple terminals + and −, varies according to the temperature at the prong tips 62*a*, the "point of balance" for the contactor 81 on the slide wire 80, is shifted according to changes in such temperature, to initiate a period of unbalance during which direct current impulses, which may be either D. C. polarity, are passed by the converter contacts alternately through the different *It* transformer primary windings, said impulses being of one or the opposite D. C. polarity, according to whether the relative potential arising at the thermo-couple, or that supplied by the battery $B_2$, predominates to supply current to the convertor.

The electrical system of the potentiometer comprises the Wheatstone bridge portion *Wb*, the conversion stage comprising the convertor CR and transformer *It*, the electronic voltage amplifier apparatus indicated at *Va*, the power amplifier apparatus *Pa*, and the balancing motor *Ro*, which by mechanical transmission means symbolically indicated by gearing pinion 84 and gear 92 is effective to move the Wheatstone bridge contactor 81 along the slide wire 80, together with the pointer E across the thermometric scale Sc, in either direction according to the direction of motor rotor rotation.

Briefly, the function of rotating the rotor of the motor *Ro* in either opposite direction is effected by directing a first flow of alternating current from the power mains A. C. through a first winding *Ro*–1, of a pair of sets of motor energizing windings, and then by directing a second flow of alternating current from the output end of the power amplifier PA, which is of the same periodicity as that from A. C., but which results from the impulses of direct current passed through the contacts X and *y* of the convertor vibrator, thence successively through the transformer *It*, the electronic voltage and power amplifiers *Va* and *Pa*, to the second motor winding through the conductors 101, whose phase of alternating voltage leads or lags that of the first said flow of alternating current by as much as 90°, through the second set of motor energized windings, and the direction of rotation of the motor rotor may be reversed by the relative facts of phase lead or lag, and is stopped when current passing through the convertor *Cr* is decreased to a negligible value when the Wheatstone bridge is balanced.

The electronic circuit achieves proper phase displacement of the alternating current voltage of the said second flow which passes through the conductors *c* to cause rotation of the said motor rotor in the proper direction to place the potentiometer contactor 81, also the pointer E, "in balance" by virtue of the transmission drive, which is only incompletely shown symbolically, but which comprises a reduction gearing between the rotor shaft and the pinion indicated at 84, which here is indicated as being in mesh with the driven gear 92 which carries the contactor E and pointer 81, will be best understood by reference hereby made to prior United States Letters Patent owned by the Brown Instrument Company of Philadelphia, Pennsylvania, which contains a more complete and specific description of the potentiometer electronic apparatus, comprising the Wheatstone bridge portion WB, the conversion stage *Cr*, the voltage amplifier stage *Va*, the power amplifier stage *Pa*, and the balancing motor, and drawings showing the same in all essential details.

Among such patents, the following are sufficiently informative as to render unnecessary the duplication of complete and specific disclosures of the above herein: U. S. Pat. No. 2,423,540 to W. R. Wills, dated July 8, 1947; U. S. Pat. No. 2,442,329 to Harrison et al., dated May 25, 1948.

Referring now to Fig. 16, by the provision of a radial projection SOC of a disc SO which is mounted co-axially on the reverse side of the gear 92 and which carries the pointer 81, and contactor E, means are provided for operation of a pair of switches *St* and $S_2$ at different times to provide a short time period during which, after a billet in the furnace is brought up to the desired maximum temperature, its heating may be discontinued, and then resumed before said billet has cooled more than to be reduced to a slight predetermined lower temperature.

Assuming that the pointer 81 and contactor E are swung by the motor *Ro* in the counter-clockwise direction during the progressive heating of the billet 31 and thermo-couple prong tips 62*a*, to a "balanced" position where the disc 30 has caused the disc projection SOC to sufficiently deflect the interposed switch blade of the switch *St* to cause the contacts of said switch to be closed, current from the power leads N–2 and N–3 will flow through the winding of relay BR through the then closed contacts of the switch, and through normally closed contacts $D_2$ of a relay D, shown in Fig. 13, to operate the relay BR, which will close its normally open contacts *a*, and break its normally closed contacts *b*, which are also indicated in Fig. 13, together with the winding of said relay BR.

Closure of the contacts *a* will lock the relay BR up, i. e., maintain its energization through the normally closed contacts of the switch *Sx*, until the subsequent reversed or clockwise movement of the disc projection SOC engages the blade of the switch *Sx* and breaks its contacts, whereupon the locking circuit for the winding of the relay BR which initially included the contacts of the switch *Sx* is broken, the relay BR is deenergized, and its contact sets are restored to normal as shown.

Inasmuch as the normally closed contacts *b* of the relay BR are, as best shown in Fig. 13, serially included in the energizing circuit of a large relay PCR which by a normally closed set of contacts PCR–1 controls the energization of the operating magnet ML for actuating the three sets of mercury switches in three-phase, high voltage power leads $L_1$, $L_2$ and $L_3$ which lead to the primary windings of the three-phase transformer 3*t*, which by its secondary windings supply power for heating the furnace induction coils 1, 2 and 3, it is clear that whenever relay BR is energized as above described, the contacts thereof, at *b*, break the energizing circuit of relay PCR and heating of the billet is effectually discontinued.

However, since the relay BR, shortly after its energization by closure of the *St* switch contacts, may be deenergized as a result of a slight amount of slow cooling of the billet 31*x*, consequent clockwise or reverse rotation of the rotor of the motor RO effective to reverse rotation of the disc SO to cause it to break the described locking circuit of the relay B*r*, the reclosure of the contacts *b* of said relay B*r* restores energization of the relay PCR and consequently the flow of current to the induction heating coils, 1, 2 and 3 is resumed to re-heat the slightly cooled billet 31, and the foregoing cycle of recurrent heating and cooling over a short range of high temperatures is continuously repeated to maintain the billet at or near its desired maximum temperature until stopped by the operator.

The blades of the switches *St* and S*x* are respectively anchored at the different points indicated at S which represent a supporting element for the blades and in order to individually adjustably vary the positions of the up-turned cam follower end of the switch blades, the elements S are assumed to be mounted on a blade which is adjustably rotatable about the axis of SO and the individual elements S are relatively, independently adjustable on the adjustable blade to vary the spacing between their up-turned ends.

Ordinarily where the billets are of such material so as to cause their maximum temperatures to preferably be in the neighborhood of 825°, the inter-spacing between the portions of the switch blades of the two switches should be so adjusted that the drop in temperature of the billet between the re-opening of the contact *St* and the subsequent opening of the contacts S*x* should represent a difference in temperature at the billet of not more than 30°. This range of temperatures may be increased or decreased according to the relative adjusted positions of the elements S.

Normally, though, the operator's attention will have been attracted by the position of the potentiometer pointer 81 which affords notice to him that the heated billet should be discharged from the furnace.

Pursuant to such notice the operator should operate the push button switch PB to energize that magnet DO, of a pair of DO and DC, the first of which controls the adjustment of the four way valve V to direct compressed air through the duct 75 to the cylinder of the air motor A, to cause its piston to be thrust to the right, as viewed in Fig. 1, thereby moving the gate or door arm 52 to the right, outwardly and upwardly out of the path of discharge of the heated billet, which may now be discharged. Initial outward movement of the arm 52 will immediately permit the spring 94 to close the set of contacts DLS–1 of the limit switch DLS which previously were forced open when the gate door was previously closed, and these contacts being serially connected in circuit with the winding of the relay D, these contact sets will now be in their alternate position of adjustment with respect to their positions which are illustrated.

The contacts D–1 of said relay D will thus be broken, and as these are serially included in the circuit of the relay PCR, said relay PCR will be de-energized to interrupt the flow of energizing electrical current to the furnace heating coils 1, 2 and 3.

A second set of DLS–2 of normally closed contacts of the switch DLW, normally short-circuit the conductors 63 which lead from the thermocouple unit of Fig. 10 to the potentiometer B, affords a means for restoring the potentiometer indication to zero when the furnace gate 52 is open, or retracted.

If the operator has operated the push-button switch PB at a time after the switch *St* has been closed as a result of the potentiometer gear 92 and disc SO having arrived at the "balanced" position, and when the windings of the relay BR will have been energized through the contacts of said switch *St*, and locked up by a circuit including the contacts of the switch S*x*, then in such case said relay is de-energized and its locking circuit broken at the contacts D2 when the relay D is energized as aforesaid.

As a result of the foregoing, the relay B*r* is restored to normal position, ready to be operated with respect to the heating of the next billet to be supplied to the furnace.

Following opening of the door or gate 52 as aforesaid, the heated billet is discharged, as a result of the projection of a cool billet into the inlet end of the furnace, onto the conveyor rolls 47 which may be continuously rotated, or rotated whenever desired by closure of the double-pole electric switch C*s*, to energize the motor M, which drives said rolls, through the gearing R*g*, the shaft 48, and sprockets and chains 51 and 49, said discharged heated billet being then passed in any suitable way to the forging dies, not shown, for processing.

The billet-feeding operation is initiated at a time when the coils 1, 2 and 3 are de-energized, by a retractive movement of the arm 36 in response to a corresponding thrust movement of the air-motor piston 43, effected by air pressure admitted through the duct 42 to the remote right end of the air motor cylinder 34, as viewed in Fig. 1, and movement of said arm 36 causes it to engage the lever arm 37 to rotate the shaft 38 and thus swing the cam element 33 as above described.

Reversed movement of the piston rod by air pressure applied through the duct 44 to the left end of said cylinder, removes the arm 36 from engagement with the lever arm 37 which then is swung by the spring 45 to restore the cam element 33 to the solid line position of Fig. 9. In such position, the longer arm 33*b* of the cam 33 engages the next succeeding billet 31*a* which had previously advanced to the dotted line position of Fig. 9, and now has been released to descend to its solid line position where the longer cam arm 33*b* will obstruct its further descent.

Meanwhile, the piston 43, of the air-motor 34, continuing its movement towards the right, as viewed in Fig. 1, moves the piston rod 35 to the right, Fig. 1, and thereby moves the thrust arm 36 toward the coil assembly 123, and a thrust rod 46, rigidly secured on the end of said arm 36, is thereby advanced to engage the central portion of the end of the billet 31, precedently deposited on the rollers 41 as described in readiness for heating, and said billet is thereby thrust forwardly until it achieves a position within the coils, 123, where it is substantially coextensive with said coils.

The thrust rod 46 as shown in Fig. 11, is longitudinally adjustable with respect to its holder 36, so that longitudinal extent of projection of a work-piece, such as 31, thereby, may be varied to dispose its leading end face 31*x* at any of different predetermined positions in the region of the remote end of the compartment tube 6 as may be desired to effect desired inductive heating effects, or in the case of other embodiments not here shown, to ensure desired repellant magnetic thrust effects, in cases where a polyphase travelling field effect is not utilized for the purpose.

Should a precedently and still properly heated billet 31x be within any portion of the heating compartment within said coils, at the time that the above and cold billet 31 enters the said coils, such heated billet is engaged by the forward end of the inwardly moving cold billet, and as a result of the thrust effort imparted by the rod 46, the heated billet is pushed ahead and out of the discharge end of the heating compartment within said coils, whereupon it is discharged from the furnace onto bevel conveyor rolls 47.

To facilitate continuing billet-delivery movement to the said out-thrust precedently heated billet 31x, the said conveyor rolls 47, which are arranged in successively interspaced pairs, with the rolls of each pair being laterally interspaced on a different one of a plurality of rotatable shafts 50, are driven by said shafts which in turn are driven by an electric motor M through reduction gearing P, a drive shaft 48, chains 49, and sprockets 51, said motor being operable by closure of the double-pole electric switch DP, Fig. 13.

The rolls 47 are in the form of bevel conveyor gears having teeth which frictionally grip the hot billet and pull it from the furnace and advance it to a discharge point beyond the series of pairs of conveyor rolls, where the billets or other heated work-pieces are, in any convenient way, further advanced to a desired location, for the purpose of processing, as by forging, extruding, or rolling mechanisms.

With the relay D energized, following the initial movement of the door gate arm 52 in the opening direction, as above set forth, an energizing circuit for the electromagnet L is prepared by closure of the contacts of a switch BLS, said switch contacts being closed during the period of time required for the passage of the discharged heated billet 31, past, and while engaging, an operating lever LS, of said switch.

Energization of the electromagnet L operates a valve mechanism LL, Fig. 1, and directs compressed air through a duct 42 to the left hand end of the cylinder of the air motor 34 to move the piston 43 thereof to the right, whereby its rod 35, and the push rod 46 carried on an arm 36 affixed to said rod 35 are moved in the same direction to cause the end of said push rod to engage the cold "ready" billet 31 previously deposited on the rolls 41 as heretofore described and to push said "ready" billet into the furnace. During projection of said new cold billet in the furnace, the foremost end thereof engages, and forces, the heated billet from the furnace and onto the tractive conveyor rolls 47.

After the heated billet has left the furnace, the operating element of a trip switch BLS is momentarily engaged by the billet to close a pair of contacts in an energizing circuit for the electromagnet D. C. which, in addition to the electromagnet DO, is also associated with the four-way valve V, and since the said energizing circuit includes normally, and now closed contacts of the now de-energized relay PCR, the electromagnet D. C. is operative to cause compressed air to pass through the valve mechanism V and via the duct 74 into the right hand end of the cylinder of the air motor A, Fig. 1, to cause forward and downward movement of the gate-arm 52 to close the outlet opening at the right of the furnace and to present the thermocouple prong tips 62a for indenturing engagement of the next initially cool billet disposed in the furnace.

Whenever the gate-arm 52 is restored to "closed" position as shown in Fig. 7, by operation of the switch BLS shown therein, said arm 52 engages the operating element of the switch DLS to re-open its contacts and in turn said opened contacts open the circuit of the relay D to restore its contact sets to the positions shown in Fig. 13, whereupon reclosure of the contacts D1 of said relay D completes the energizing circuit of the relay PCR which closing its contacts PCR-1 energizes the actuating electromagnet ML for the mercury switches MS, to r store the application of power to the furnace coils 1, 2 and 3 as previously related, and the said new billet is heated, the potentiometer apparatus of Figs. 16 and 16a operating as before described for the purposes previously set forth herein.

A relay PT, having a single set of normally open contacts, and being energizable through serially related safety contact sets TS, PS and TC all of which are properly closed throughout all furnace operations, is provided, each of the respective said sets of contacts being, if opened, adapted to break the circuit of the relay PT, whose contacts are thereby opened to interrupt the energizing circuit of the power controlling relay PCR. Contacts PCR-1 will then be broken to interrupt at MS, by de-energization of the magnet ML, the supply of furnace energizing 3-phase current to the furnace, whereby heating by the furnace coils 1, 2, and 3 is discontinued.

Fig. 13 diagrammatically indicates certain of the operable elements of a well-known type of timer mechanism which is preferably employed to prevent over-heating of a billet, in any case where the apparatus shown at B fails to properly control such heating.

The typical timer mechanism here assumed to be employed is that which is commercially supplied by the Eagle Signal Corporation of Moline, Illinois, the details of which are fully disclosed in United States Letters Patent No. 2,125,865 dated October 10, 1939, and granted to C. L. Anderson to which patent reference is hereby made for a complete showing of the mechanism.

The timer elements indicated in Fig. 13 are a synchronous motor TM, a solenoid clutch magnet C, a plurality of sets of contacts which includes the set shown at T, a clutch CL operated by the magnet C to deliver power from the motor shaft to the uppermost shown cam-shaft through reduction gearing TRT, and a lift bar LB, operable by the magnet to place the contact sets into operative relation to the cams TSC on the said cam shaft and at the same time to effect initial closure of the contacts T, said contacts T being re-opened by the cam TSC at the end of the timing period, which was initiated when the relay PCR is energized.

The clutch magnet is de-energized, the cams and an elapsed time indicating pointer (not shown) are restored by a spring SG to normal, and the motor is stopped. Herein the contact set T, is closed by the foregoing timer mechanism whenever, after the motor circuit is closed by closure of normally open contacts of the relay PCR, the circuit of the clutch magnet C is then closed by re-closure of normally closed contacts D-4 of the relay D, which occurs when the switch DLS is operated by movement of the gate arm 52 to its operative position of Fig. 7, to open its contacts DLS–1, which are in the energizing circuit of said relay D.

The clutch magnet being closed, at the outset of a billet heating period, the timer motor clutch C is operated to deliver power to the aforesaid cam shaft which rotates to open the contact set T, after a period which is substantially longer than would be necessary to permit the billet to be properly heated, but for a shorter period than that during which the billet would reach a near-melting temperature.

Reference is made to the aforesaid patent to Anderson for a more complete disclosure of the instrumentalities employed and the modus operandi.

Generally, however, in connection with the circuit instrumentalities of Fig. 13, the synchronous motor TM is energized by current supplied thereto, in response to closure of the contact set PCR–3 when the relay PCR is energized to start furnace heating of a billet.

Also, when the furnace gate-arm 52 is in workpiece obstructing position, and the normally closed contacts of the set D–4 of relay D, are thereby opened, as a result of the door switch contacts DLS–1 being open, current is supplied through the said contact set D–4 to the clutch magnet which closes the controlling contacts T of the timer such closure being maintained during a predetermined period of timing when by a cam TSC, operated by the motor, the contacts T are again opened, and as shown in Fig. 13 such opening of the contacts T, breaks the circuit of the relay PCR and terminates heating of the billet in the furnace by opening of the mercury switches MS in response to opening of the contacts PCR–1 of the relay PCR and consequent de-energization of the operating electromagnet ML for the mercury switches.

Opening of the circuit to the clutch coil C by virtue of energization of the relay D when the furnace door is opened is effective to permit a spring SG to restore the clutch and contact operating means together with a timing pointer TP to then normal positions.

The timer is not necessary to the operation of the above system and may be omitted entirely, and if omitted the contacts T will not be interposed in the energizing circuit of the relay PCR, but where used it is employed as an additional safety device to better ensure that, at the end of a predetermined period, which must not be exceeded, if the operator or the potentiometer switch St fails to timely shut down the furnace heating, the timer will be available to perform such shut-down function. Heating beyond such period would be dangerous since the billet might be melted with consequent injury to the furnace parts.

A relay PT having serially related contacts sets TC, PS and TS in its circuit will be energized to close its single set of contacts in the energizing circuit of the relay PCR, if all the first said contacts are closed. The relay PCR receives energizing current through said contacts of the relay PT, and therefore if any of the contacts TS, PS and TC are opened, the relays PT and PCR will be de-energized, and the furnace coils 1, 2 and 3 cannot be energized.

The contacts TS are opened, when water temperature is too high or too low, because of operation of thermally responsive switch actuating means TSB being operable by expansion or contraction of a column of expansible liquid, in response to the temperature of a bulb BU which is exposed to the coolant water discharged from the coils 1, 2 and 3; similarly the contacts PS are opened when the supply of coolant water being supplied to the coils 1, 2 and 3, is of too low pressure, and the contacts TC are opened whenever doors permitting access to the electrical transformer and other dangerous instrumentalities are opened. In any case, opening of any of the contact sets TC, DS and TS de-energizes the relay PT, also the relay PCR and renders it impossible to operate the furnace until the improper condition causing any of the said contacts to open, is remedied.

Any or all of the relays such as D, PT and PCR may be of the solenoid types, as also, preferably, are the valve activating magnets DO, DC and L.

The valve controlled by the magnet L, is provided with a spring to restore it in response to de-energization of the magnet L. Each of the magnets DO and DC for the valve V, when energized, move the valves thereof to different positions of adjustment, and said valves are only restorable by de-energization of such previously energized magnet, and in response to energization of the other of said magnets.

Referring further to the circuit diagram of Fig. 13, at CS and ST are shown separately manually operable switches, which are respectively operable to supply energizing alternating current, at A. C., to the billet conveyor motor M, and to those circuit instrumentalities which derive current from the power conductor N–2, including the energizing circuit for the relay BR.

The switch ST is to be operated whenever it is desired to put the electrical system of Figs. 13 and 16 in operation, i. e. for the purpose of operating the furnace, whereas the switch CS is operated only for the purpose of driving the motor M. Both switches CS and ST are of any two-way locking type.

The long dotted line of Fig. 13, extending between the lowermost contacts T, which are duplicated in the upper portion of Fig. 13, signifies that both showings relate to the same pair of timer contacts, whereas the dotted lines diverging from a circle ML of Fig. 15 extend from a magnet here represented here by the circle, to triplicate sets of duplicate pairs of mercury switch contacts MS which sets of contacts are closed in response to energization of the magnet NL, which is indicated conventionally in Fig. 13.

At CT in Fig. 16 a "cold-junction" thermo-couple unit is shown as serially connected in circuit with the prongs 62 of the thermo-couple unit 84 of Fig. 10, with its potential opposed thereto, and is operable in accordance with well-known thermo-couple principles, its potential being set up by ambient temperatures; the contacts DLS–2 are preferably adapted to short circuit both the controlling and serially related cold-junction units CT and 84.

The symbols A. C. in Figs. 13 and 16 indicate a single source of single phase 60 cycle alternating current, which is relied upon to energize the electrical instrumentalities to which circuit conductors, so symbolized, are connected. Such source of current is preferably entirely independent of that derived from the transformer 3T indicated in Fig. 12 and in a different manner in Fig. 15.

Certain of the instrumentalities such as the relay BR and the switch contacts DLS–2 of Fig. 16 are duplicated more or less completely in Fig. 13, so that the association of portions of both said figures of drawing may be readily understood. The mechanical connector of Fig. 12 is for the purpose of providing a certain amount of "lost motion" between the piston rod 35 of the air-motor 43, and the in-feed rod 46 of Fig. 1, smoother operation of these parts.

Although the embodiment illustrated and described wherein a polyphase travelling field of magnetic force is inevitably produced, is preferred, in other embodiments, initial positioning of the work-piece by the thrust rod 46, so that a slightly major portion of its length is disposed beyond the longitudinal middle of an inductor coil energized by low-frequency current, prevents undesirable rearward electro-magnetic thrusts being imposed on the work-piece, but to the contrary, is made to utilize a magnetic force which is effective to thrust the work-piece forwardly to cause it to be firmly maintained against the stop 85.

Having described a presently preferred embodiment of our invention and/or inventions hereof, we are aware that numerous departures from the precise instrumentalities, shown may be made, and other variant equivalent circuit arrangements may be provided within the spirit hereof. Also we are aware that certain inventive features herein disclosed may be employed in connection with other furnace structures and/or with other types of controlling apparatus which are ancillary to the herein-disclosed three-phase furnace.

We claim:

1. An electric induction for depth heating of a metal work-piece, which comprises an assembly of three helical coils which are relatively disposed in co-axially aligned end-to-end relation to define by their joined interiors, an elongated open-ended furnace compartment formed to receive such work-piece loosely longitudinally telescopable therein through an in-feed end opening thereof, and being dischargable from the opposite end thereof, a source of polyphase low voltage and low frequency alternating current, and electrical circuit conductors so interconnecting the power leads from said source as to cause currents of different phases to flow through differently longitudinally disposed of said coils in such circuitous direction as to effect a re-active electromagnetic force to be exerted on said work-piece, resulting from current flows of different phases in said different coils, to tend to project said work-piece in the discharge direction thereof and a single obstructing door stop member removably disposable at said discharge end of the said compartment to center said work-piece within all said coils and to restrain further outward movement of the work-piece during inductive heating of the work-piece by the effect of said current flow in said coils, temperature responsive, electrical means comprising an actuating control element and means concurrently movable with said stop member to removably dispose said actuating element in firm engagement with the middle region of a leading end face of said work-piece, during heating thereof.

2. An induction furnace apparatus comprising an induction unit comprising a plurality of longitudinally aligned helical coils, a thin-walled tube interiorly supporting said coils and defining a heating compartment, and affording a support for a work-piece within said compartment, a first motor means operative to introduce a work-piece within said compartment, a gate member movable to and from an operative position, a source of low voltage alternating current for energizing said coils, electric circuit conductors including a serially related set of power switch contacts adapted to interconnect said source with said coils, an electro-couple element comprising a pair of pointed prongs of different materials having different temperature induced electrical potential gradients, operative for impingement of their points into an end surface of said work-piece concurrently with operative positioning of said gate arm, electric indicator means comprising a motor-driven element operative to indicate by its position the difference in electrical potential between said prongs in terms of temperature of said work-piece and control means operable by said element when driven to a position representing a predetermined maximum temperature thereof to effect opening of said power switch contacts to discontinue induction heating of said work-piece, a second control means so disposed for operation by said motor driven element subsequently to operation thereby of the first said control means, whenever said motor-driven element has meanwhile taken a predetermined lower temperature indicating position, and said second control means being operative to effect reclosure of said power switch contacts to renew inductive heating of said work-piece, and said first and second control means being thereafter alternately operable, resulting from to-and-fro motor-effected movements of said motor-driven element.

3. In an electric induction furnace of the type having a tubular heating compartment provided with an end-opening, and which is surrounded by induction coil winding means and within which compartment an elongated work-piece may be inductively heated, a thermo-couple unit having a pair of pointed thermo-couple prongs of relatively different metallic composition, a support for said unit which is adjustably movable toward and from a position wherein said prong points are projected within said compartment opening, to provide for impingement of both said prong points against an end surface of said work-piece, a source of alternating current for energizing said coil means, switch means for substantially connecting and disconnecting said source and said coil means, and means operable, in response to a predetermined degree of heating of said points, to cause said switch means to be so operated as to substantially disconnect said coil means from said source.

4. Induction furnace apparatus of the general type described whereby a metal work-piece is inductively heated in depth within a substantially horizontal elongated compartment closely surrounded by convolutions of an induction winding, said apparatus comprising said winding, a source of low-frequency current, electrical conductor means operative to communicate current from said source to said winding to energize the same to cause it to inductively effect heating of a said work-piece previously disposed in said compartment, said compartment having at least one of its longitudinal ends open, a thermo-couple element projected within said compartment end-opening for presentation thereof towards an end face of the work-piece which is disposed in the region of said open end of the compartment, yieldable pressure means to cause said element to be in a relatively extended position toward said end face, an obstruction stop also disposable in a relatively less extended position in said region for engagement by said end face, said conductor means being operative to so direct said current through said winding as to effect a magnetic longitudinally directed thrust upon said workpiece to cause its end face to be pressed against said stop to electromagnetically maintain the work-piece in a predetermined longitudinal position with respect to said winding for efficient induction heating of said work-piece, said magnetic thrust being also effective, in response to engagement of said end-face against said element to force it to a less extended position which is predetermined by the position of said stop in opposition to the pressure exerted on the element by said yieldable pressure means to cause the degree of pressure engagement between said end face and said element to be maintained substantially constant and temperature indicating means operative to currently indicate prevailing temperatures of said face within a broad range of temperatures thereof including the maximum temperature to which it is desired to heat said work-piece, and said indicating means being operable in response to, and commensurably with, the temperature of said element achieved in response to heating of said element by the thereby engaged end face of said work-piece at all times said work-piece is being inductively heated in said compartment.

5. The apparatus substantially as set forth in claim 4 characterized by the provision of electrical switch means interposed in the circuit of said conductor means, said source, and said winding, being actuable to interrupt the said circuit to effect discontinuance of inductive heating of a work-piece in the heating compartment, and electrically operable means rendered operative in response to a predetermined temperature imparted by said work-piece end face to said thermo-couple element, to effect actuation of said switch, to effect interruption of said circuit.

6. The apparatus substantially as set forth in claim 4, characterized by the provision of movable support means for said element and said obstruction stop, and by the provision of means for discharging a heated work-piece in the longitudinal horizontal direction from the end opening of said heating compartment, motive means operative to concurrently alternately cause each said stop and said element to be shifted to alternate positions in a first of which they are removed from the path of discharge of said work-piece, and in the second of which they are disposed in obstructive relation to said end opening.

7. In low-frequency induction heating apparatus, the combination of an inductor comprising plural solenoidal winding sections, a thin-walled horizontally extending elongated tube comprising an inner metallic longitudinally split metal liner, and an outer covering of non-metallic heat insulating material, said inductor sections being telescopically disposed in end-to-end longitudinal succession over said tube and rigidly affixed to its outer surface, said liner having an end-opening through which a metal work-piece disposed within the liner may be discharged, transformer means deriving from a conventional polyphase commercial low-frequency alternating current source, a plurality of successively phased single phase low-frequency current flows, electrical conductor means for separately directing said flows, taken in the order of their phase sequence through respective of said inductor sections, to effect energization of any section located more remote from said liner end-opening by a flow of a relatively leading phase, to produce a "travelling field" of magnetic flux within said liner to inductively heat said work-piece and concurrently to subject said work-piece to a magnetic tractive force tending to discharge said work-piece longitudinally of the liner through said end-opening, a stop member, a movable support therefor, motive means for alternately moving said support to alternate adjustment positions in a first of which said stop member is shifted to a set location at said liner end-opening with a portion thereof so disposed as to be engaged by a leading end-face of a said work-piece in response to the magnetic force exerted thereon during energization of said inductor sections to inductively heat it to cause the said work-piece to be disposed in a preferred longitudinal location within said liner for efficient induction heating thereof, and said support means at its other location being operative to remove said stop-member from the horizontal path of discharge of a said work-piece through said end-opening, and electrical switch means automatically operative, upon positioning of said support means in said other location, to prevent energization of said inductor sections.

8. An induction heating apparatus including an induction heating winding disposed on a tubular support affording, by its interior a compartment open end in which successive work-pieces may be received and heated, and from which they may be singly discharged, comprising in combination with said winding and support, a source of low frequency alternating current, switch means adapted when operated to effect communication of current from said source to said winding, to energize it, an obstruction stop member, a thermo-couple element having a thermo-electrically responsive forward end portion, power means adapted to move said member and said element to a set position wherein they are in obstructing relation to the discharge of a work-piece from said compartment wherein, they are longitudinally aligned with said compartment, means operable in response to positioning of said element and member in said set position, adapted to effect operation of said switch to effect inductive heating of a work-piece in said compartment and to cause an electromagnetic thrust to be exerted on said work-piece to cause its leading end face to be held in engagement with said member and said element portion, and means jointly operable in response to a current flow thermally produced by said element portion when heated by conduction of heat thereto from the said end face of the heated work-piece adapted to indicate the temperature of the said end face of said work-piece, and to disable said switch means, in response to a predetermined indicated maximum temperature of said work-piece end-face.

9. An electric induction furnace for depth heating of elongated metal work-pieces which comprises rigidly anchored a coil unit including a plurality of inductor coils disposed in co-axially horizontally extended successive end-to-end relationship, to define by their joined interiors, an elongated furnace compartment which, at an end thereof terminates in a compartment opening, said compartment being tubular for receiving a metal work-piece loosely telescoped therein, electrical transformer means deriving from a source of low-frequency polyphase alternating current a plurality of separate single phase current flows of phases, conductor means for separately so directing each of said flows from said transformer means through a different one of said successive inductor coils to produce within the compartment surrounded by said coils, a succession of magnetic fields of flux of respectively sequential phases proceeding towards the said open end of said compartment, to effect energization of said unit, to inductively heat said work-piece and to subject the same to a strong alternating travelling magnetic field of flux which is so directed as to tend to force the work-piece longitudinally in the horizontal direction of and through the said compartment end-opening, a stop member, movable means for adjustably disposing said member at a predetermined set location within the confines of said end-opening so as to be in obstructive relation to a leading end-face of said magnetically forced work-piece to cause the same to be maintained in a desired longitudinal position within the compartment by the conjoint effect of said force and of the set location of said member, during inductive heating of a said work-piece within the compartment, and said movable means being alternatively operable to remove said member from said set location to an inoperative position removed from alignment with said compartment.

10. An electric induction furnace for depth heating of elongated metal work-pieces which comprise a coil unit including a plurality of inductor coils rigidly held in co-axial horizontal aligned, end-to-end relation, an elongated metal work-piece receiving compartment surrounded by said coils, said compartment having a terminal end-opening, electrical transformer means deriving from a polyphase electrical current source a plurality of separate single phase current flows of respectively different phases, conductor means for separately so directing each of said flows from said transformer means through a respectively different one of said successive inductor coils to cause each to produce within the portion of the compartment surrounded by its associated coil a magnetic field of flux, the magnetic fields of flux produced thereby being of successive phases proceeding in order from the coil most remote from the compartment opening to effect energization of said unit, to conjointly inductively heat said work-piece, and to subject the same to a strong alternating travelling magnetic field of flux which is so directed as to tend to force the work-piece longitudinally in the horizontal direction of and through the said compartment end-opening, a stop member disposable at a predetermined set location within the confines of said end-opening so as to be in obstructive relation to a leading end-face of said magnetically forced work-piece to cause the same to be maintained in a desired longitudinal position within the compartment by the conjoint effect of said force and of the set location of same member, adjustable means operable to dispose said stop in said set position, and which is alternately operable to be so moved as to remove said stop member to an off-set position wherein it is removed from the path of outward movement of said work-piece through said compartment end-opening, and electrical switch means operable, in response to disposition of said stop member in said off-normal position, to prevent energization of said coils by said current flows.

11. The low-frequency electrical induction heating furnace of the type described, for the heating of elongated metal work-pieces, comprising an elongated substantially thin-walled tube and whose interior affords a heating compartment for the reception of a said work-piece for inductive heating thereof, a substantially rigid frame supporting said tube, an inductor comprising a plurality of convolutions of a tubular fluid-conductive electrical conductor which circuitously surrounds said tube, said frame comprising clamp means for substantially rigidly holding all said conductor convolutions against lateral dislodging movements in either direction longitudinally of the tube, a stop member having a work-piece obstructive contact portion which is disposable at a predetermined set location within an end portion of said tube, electrical conductive means to effect energization of said inductor by so communicating thereto alternating current of low-frequency to effect the production of a primary field of magnetic flux which permeates the material of said work-piece to induce circulating heating eddy-currents therein, the same being productive of a relatively secondary field of magnetic flux, and the latter being so directively reactive relative to said primary flux as to cause a substantially strong magnetic force to be so exerted between said inductor and said work-piece that said work-piece, is resultantly exposed to a magnetic thrust exerted thereon in that direction which extends longitudinally of said tube toward said member, to cause the leading end-face of said work-piece to be obstructively engaged with and to maintain engagement with the said contact portion of said member to ensure that said work-piece during heating thereof, is forcibly held in that final operative lonigtudinal position within said compartment, which is predetermined by the set location of said member, means operative to move said stop member from its said set position out of obstructive relation to said work-piece, and means rendered operative, in response to disposition of said member in non-obstructive relation thereto, to disable said conductive means to prevent energization of said inductor.

References Cited in the file of this patent

UNITED STATES PATENTS

| Number | Name | Date |
|---|---|---|
| 939,109 | Switzer | Nov. 2, 1909 |
| 1,776,823 | Summey | Sept. 30, 1930 |
| 1,924,680 | Esmarch | Aug. 29, 1933 |
| 2,229,680 | Somes | Jan. 28, 1941 |
| 2,281,334 | Somes | Apr. 28, 1942 |
| 2,325,638 | Strickland, Jr. | Aug. 3, 1943 |
| 2,329,188 | Denneen | Sept. 14, 1943 |
| 2,415,376 | Strickland, Jr. | Feb. 4, 1947 |
| 2,556,234 | Strickland, Jr. | June 12, 1951 |

OTHER REFERENCES

Materials and Methods, pages 399–410, August 1946.

Electrical World, October 26, 1946, pages 62–64.

Steel, April 7, 1952, pages 118–119.